R. R. CROCKER.
AUTOMATIC GREASER FOR LIVE STOCK.
APPLICATION FILED SEPT. 13, 1915.
1,170,964.
Patented Feb. 8, 1916.
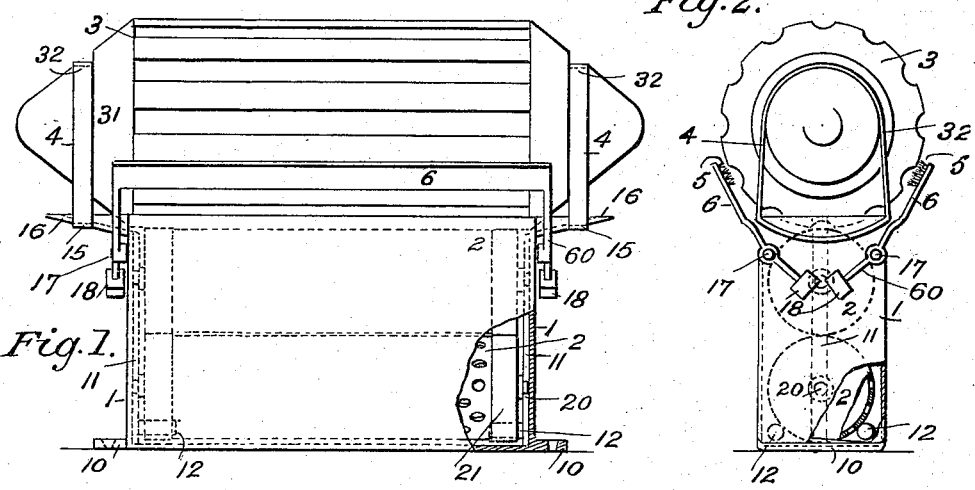
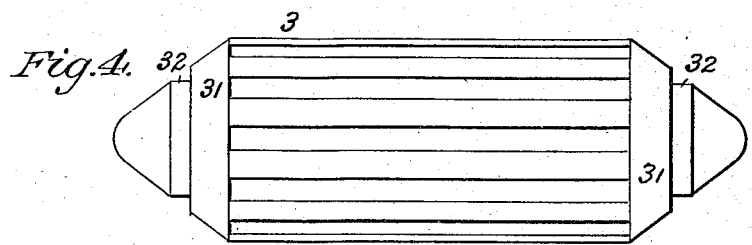
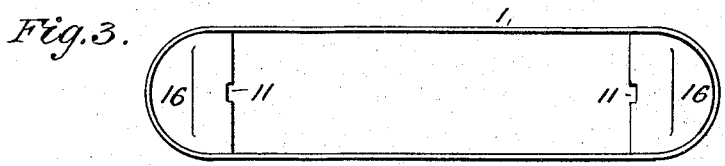
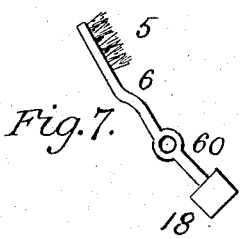
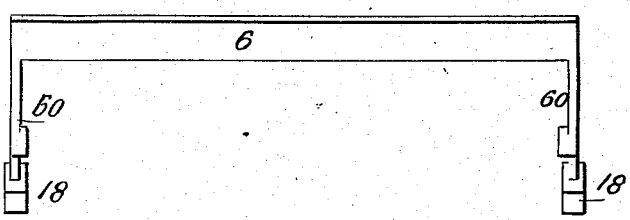
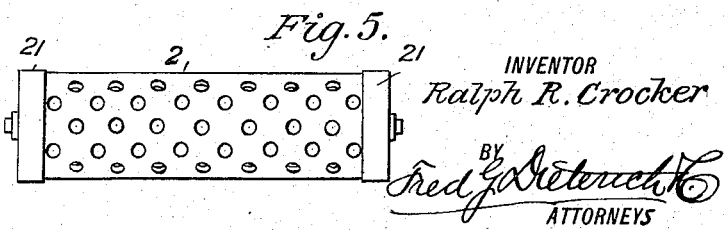
INVENTOR
Ralph R. Crocker
BY
Fred J. Dieterich
ATTORNEYS

UNITED STATES PATENT OFFICE.

RALPH RORER CROCKER, OF LINCOLN, NEBRASKA.

AUTOMATIC GREASER FOR LIVE STOCK.

1,170,964. Specification of Letters Patent. Patented Feb. 8, 1916.

Application filed September 13, 1915. Serial No. 50,362.

*To all whom it may concern:*

Be it known that I, RALPH RORER CROCKER, residing at Lincoln, in the county of Lancaster and State of Nebraska, have invented a new and Improved Automatic Greaser for Live Stock, of which the following is a specification.

This invention has reference to that class of appliances designed for distributing and applying insecticides and disinfectants to bodies of live stock as a preventive and cure for lice, mange, etc., and my said invention primarily has for its object to provide a simple and inexpensive appliance of the general character stated in which is included an improved arrangement of a self-feeding roller that absorbs the insecticidal liquid from the supply tank as it applies the liquid to the affected parts of the animal as the said animal rubs against the roller.

Another object of my invention is to provide certain improvements in an appliance as stated, in which is included means for catching the dripping from the roller and returning it to the fluid holder and other means for automatically clearing the roller of dirt, as it is being turned by the animal rubbing against it.

With other objects in view that will hereinafter appear my invention embodies the peculiar construction and novel combination of parts hereinafter described, specifically pointed out in the claims and illustrated in the accompanying drawing in which:

Figure 1 is a side elevation of my improved animal greaser. Fig. 2 is an end elevation thereof. Fig. 3 is a plan view of the liquid holding tank. Fig. 4 is a side elevation of the rubbing roller. Fig. 5 is a side elevation of one of the liquid pick up or conveying drums, and Fig. 6 is a detail plan and Fig. 7 is an end view of one of the roller clearing devices hereinafter specifically referred to.

In carrying out my invention I provide an elongated tank 1 for holding the liquid disinfectant, the lower edges of the opposite ends of which have apertured lugs 10 for fastening the appliance to a suitable base.

The tank 1 has vertical guide grooves 11, on the inner side of the ends thereof, that open at the upper edge of the tank, and the said grooves 11 are provided for receiving the journals 20 of a plurality (two being shown) of what I term the grease drums 2, each of which is of the full length of the tank and perforated as shown, the lowermost one of such drums having smooth end surfaces 21—21 that form bearings for engaging opposite pairs of lugs 12 at the opposite bottom ends of the tank, as is clearly indicated in Fig. 2 and which hold the said lower grease drum from engaging the bottom of the said tank.

While I have shown two grease drums within the tank the tank may be of any suitable depth for containing as many of such drums 2, as desired. The two drums 2 are held in frictional engagement and the liquid within the tank flows through the perforated drums and covers the peripheries thereof as they are turned.

3 designates a rubbing roller, which in practice may be a hollow drum, and the roller in my construction includes a cylindrical body of greater diameter than that of the grease drums and the width of the tank in which the said drums are held.

The cylindrical body of the roller, which is preferably corrugated throughout its length, has conical ends 31 that extend beyond the ends of the tank, as is clearly shown in Fig. 1, and the said roller has its lower end held in frictional engagement with the uppermost one of the drums 2 and resting within the upper open end of the tank.

For holding the roller 3 in its operative position, the conical ends thereof have annular bearings 32 for receiving strap bands 4—4 that engage the curved seats or bearings 15 formed on the underside of substantially semi-circular trough-like extensions 16, that project from the upper edge of the tank, and which, in addition to serving as a means for coöperating with the bands 4 for holding the roller in frictional contact with the upper grease drum 2, also serve as a means for catching the drippings from the ends of the rubbing roller 3.

5—5 designate brush members that extend along at each side of the bottom of the corrugated surface of the roller 3 and they are secured on yoke-like metal hangers 6 that include angled ends 60 pivotally mounted on studs 17—17 that project from the opposite ends of the tank near the upper edge thereof and which carry weights for holding the brushes in contact with the said roller.

The brushes 5—5 serve to brush off the dirt and mud that tends to adhere to the corrugated surfaces of the rubbing roller and constantly clean such surface as the roller is turned, in either direction, and in frictional engagement with the upper grease drum.

By reason of the peculiar construction and arrangement of the parts as described and shown, it is apparent that since the rubbing roller is wider than the tank and the grease drum, as the said roller is being turned, by the animal rubbing against it, in either direction, the grease drum or drums are caused to rotate within the tank and the grease picked up by the said drums is carried up to the roller 3 and gathered in the grooves thereof, the perforated drums 2, while serving as grease reservoirs, by reason of being perforated, also serve to agitate the thick liquid and thereby keep it in motion, it being also understood that since the bottom of the rubbing roller rests and is sustained on the upper grease roller and within the open upper end of the tank 1, grease and dirt are not scraped off the roller by the opposite upper side edges of the tank, the mixed grease and dirt being removed by the brushes, since they engage the roller at points below the axis thereof and where the animal rubs against the same, as the roller and tank in my device are relatively of such height that the animal can rub against the roller sidewise and in a standing position.

From the foregoing description taken in connection with the drawings, the complete construction, the manner of operation and the advantages of my invention will be readily understood.

While I prefer to arrange the parts, as shown, changes in form and proportion may be readily made to suit the desired conditions without departing from my invention, as set forth in the appended claims. Further, the coöperative arrangement of the several parts, that constitute my invention, is such that, the rubbing roller, the grease drums and the brush devices may be readily disconnected for packing and storing, when shipping the appliance or when it is desired to clean the same.

I claim:

1. In an appliance of the character described, a tank, a plurality of perforated grease drums, sustained successively one upon the other, means on the inside of the tank for sustaining the lowermost one of the grease drums above the bottom of the tank, a rubbing roller mounted on the uppermost one of the grease drums, and means for sustaining the said rubbing roller on the said uppermost drum, the said rubbing roller being of greater diameter than the said grease drums and the tank.

2. In an appliance of the character described, a tank, a grease drum rotatably mounted in the tank, a rotating longitudinally corrugated roller mounted over the tank, and in contact with the grease drum and gravity held pivotally mounted yokes on the tank and brushes on the yokes for brushing over the under side of the roller, substantially as shown and described.

3. In an appliance of the character described, a tank, a grease drum rotatable within the tank, a rubbing roller mounted on the tank and comprising a body portion in contact with the grease drum and conical ends that extend beyond the ends of the tank, the said tank having trough like portions that extend under the conical ends of the rubbing roller, and means engaging the said trough like portions and the conical ends of the roller for holding the roller in frictional engagement with the grease drum, substantially as described.

4. In an appliance of the character described, a tank, a grease drum rotatable within the tank, a rubbing roller mounted on the tank, and comprising a body portion in contact with the grease drum, and conical ends that extend beyond the ends of the tank, the said tank having trough like portions that extend under the conical ends of the rubbing roller, and means engaging the said trough like portions and the conical ends of the roller for holding the roller in frictional engagement with the grease drum, the said means comprising endless bands and seats on the conical ends of the roller and the trough like portions for receiving the said bands, substantially as described.

5. An appliance of the character described comprising the following elements in combination: a tank having a trough-like extension at each of the upper ends, internal bearing lugs and an internal centrally disposed vertical guide groove in each end, at least one perforated grease drum having smooth end bearings for engaging the aforesaid bearing lugs, and end journals slidable in the vertical guide grooves, a rubbing roller having conical ends, said roller being mounted on the top grease drum, said roller having conical ends that extend over the trough-like extensions of the tank, and means for holding the roller in frictional contact with the said top grease drum.

6. In an appliance of the character described, a tank, a grease drum rotatably supported in the said tank, a rubbing roller mounted on the said grease drum, and whose ends extend beyond the ends of the tank, means on the tank for catching the drippings from the extended ends of the roller and returning said drippings to the tank, and means for holding the roller in frictional contact and to its operative position within the drum.

7. In an appliance of the character described, a tank, a grease drum rotatably supported in the said tank, a rubbing roller mounted on the said grease drum, and whose ends extend beyond the ends of the tank, trough-like extensions for catching the drippings from the extended ends of the roller and returning said drippings to the tank, means for holding the roller in frictional contact and to its operative position within the tank, the said means including bearing portions on the extended ends of the roller, and said trough-like extensions on each of the upper ends of the tank, and strap bands that engage with the said annular bearing portions and the trough-like extensions on the tank.

RALPH RORER CROCKER.